United States Patent [19]
Johnson

[11] Patent Number: 6,148,667
[45] Date of Patent: Nov. 21, 2000

[54] PRESSURE VESSEL ISOLATION CARRIAGE

[75] Inventor: Kenneth Alan Johnson, Stockton, Calif.

[73] Assignee: Chemand Corporation, San Jose, Calif.

[21] Appl. No.: 09/239,460

[22] Filed: Jan. 28, 1999

[51] Int. Cl.[7] .................................................. G01F 23/20
[52] U.S. Cl. ............................................................ 73/296
[58] Field of Search .................................. 73/296, 865.8, 73/1.73; 222/64, 173; 137/386, 403

[56] References Cited

U.S. PATENT DOCUMENTS

| | | |
|---|---|---|
| 4,143,793 | 3/1979 | McMillin et al. . |
| 4,247,018 | 1/1981 | Credle . |
| 5,551,309 | 9/1996 | Goossens et al. ........................ 73/863 |
| 5,850,757 | 12/1998 | Wierenga ................................. 73/296 |

FOREIGN PATENT DOCUMENTS

| | | | |
|---|---|---|---|
| 653 440 | 11/1937 | Germany ................................. | 73/296 |
| 2020045 | 11/1979 | United Kingdom .................... | 73/296 |

*Primary Examiner*—Robert Raevis
*Attorney, Agent, or Firm*—Henneman & Saunders; Larry Henneman, Jr.

[57] ABSTRACT

A carriage assembly provides for holding a pressurizable vessel used in delivering fluid to a processing system, the pressurizable vessel having an elongated body defining a longitudinal axis, a first end, and a second end. The carriage assembly includes: a support structure for holding the vessel such that the axis is non-vertical, the support structure being substantially isolated from mechanical vibration caused by the processing system; and a sensor coupled with the vessel and operative to generate a signal indicative of the amount of fluid stored in the vessel. The support structure provides a fulcrum proximate the first end of the vessel, and the sensor includes a load sensor mechanically coupled with a portion of the vessel which is located proximate its second end. The sensor is operable to generate the signal in response to force exerted on the load sensor by the weight of the vessel.

4 Claims, 4 Drawing Sheets

PRESSURE VESSEL ISOLATION CARRIAGE

BACKGROUND OF THE INVENTION

1. Field of the Invention

The present invention relates generally to liquid transfer systems used for delivering chemical liquids to processing systems requiring high purity and an accurate liquid flow rate, and more particularly to pressurizable vessels used in liquid transfer systems to push liquid between a source and a processing system.

2. Description of the Prior Art

Liquid transfer systems typically provide for transfer of liquid chemical from one or more bulk sources to one or more end-use stations, via a series of conduits and controlled valves. An even flow rate through a liquid transfer system provides improved overall purity in the liquid delivered to the end use station which is very important in processes such as semiconductor manufacturing.

In many industrial processes, it is important to maintain process chemicals free of virtually all contaminants. For example, extremely high levels of purity are required for chemicals, such as acids and solvents, used in semiconductor wafer production. As a result of these purity standards, precise controls are required in the delivery of the chemicals to such systems. High accuracy liquid transfer systems provide delivery of high purity chemicals at an even liquid flow rate.

The use of pumps is not desirable in high accuracy liquid transfer systems because pumps may cause a pulsed flow of liquid, that is flow occurring at different pressures and velocities through the system, due to the cyclical nature of diaphragm pumps and similar devices. This pulsed flow leads to problems of contamination of the transferred liquids. Therefore, liquid delivery systems which rely upon pumps to move the liquid are less desirable than systems which move liquid without utilizing pumps.

Liquid delivery systems that do not use pumps, generally utilize controlled gas pressure generated within a pressurizable liquid holding vessel to push liquid from the vessel to the end-use stations in a controllable manner. Such systems commonly include: an intake sub-system for transferring liquid from the bulk sources to the vessels; a dispensing sub-system for transferring the liquid from the vessels to one or more end-use stations; and a recirculation sub-system for transferring the liquid from the vessels to one of the other bulk sources during periods of low demand. The subsystems typically include: conduits and valving for transferring fluids including chemicals and compressed gas; pressure gauges and flow meters for monitoring system operation; and filtering units for filtering the liquid.

One common type of system utilizes two pressurizable liquid holding vessels to alternatively deliver liquid, wherein one vessel is filled while the second vessel is pressurized to dispense liquid therefrom. By alternately filling and dispensing liquid from two pressurizable vessels, a constant, controllable flow of liquid is obtained. However, the inputting of liquid into the vessels during the fill cycle can be problematic.

In one common type of liquid delivery system, a combination of vacuum and pressure is used to transfer liquid from the bulk source to the intermediate vessels. First, a vacuum pump is used to establish a vacuum in one of the vessels to draw liquid into the vessel. Once a vessel is filled, the vessel is then pressurized to motivate the liquid to an end-use station. However, the use of a constant vacuum, pumping, or significant pressure to move liquid from a supply tank to each vessel during the fill cycle can alter the delicate chemistry of some types of liquids, such as by removing volatile organic compounds from solvents or adding small bubbles into the liquids.

Schell (U.S. Pat. No. 5,832,948, issued Nov. 10, 1998) discloses a liquid transfer system including a liquid supply tank, and at least two pressurizable liquid holding vessels. The liquid holding vessels are placed beneath the supply tank, and a liquid supply line connects the supply tank to each vessel. The liquid supply line is operated as a siphon from the tank to each vessel, in order to move liquid from the tank to each vessel. Each vessel is alternately filled and pressurized to dispense liquid from the vessel, such that one vessel is being filled while the other is dispensing liquid, and a constant controllable liquid output flow is achieved. The system also includes a liquid recycling line to recycle or constantly move the liquid within the system to achieve thorough mixing, and an in-line filter to improve liquid purity. By placing the pressurizable vessels beneath the supply tank, a siphon effect can be utilized to transfer liquid from the supply tank to the vessels. Once a siphon effect has been established, there is no further need for pressure or continued vacuum effect to move the liquid from the supply tank to the vessels, thus improving the quality of the output liquid from the system.

In each of above described prior art liquid transfer systems, the intermediate vessels are provided with one or more level sensors to detect and identify the level of chemical in each of the vessels. These sensors may include high level sensors, high level redundant sensors, low level sensors, and low level redundant sensors. These sensors are commonly mounted outside of the vessels so as to avoid maintenance and contamination problems. The most commonly used level sensors are capacitive-type sensors, such as KGE model sensor available from EFECTOR of Camarillo, Calif. The level sensors are used to determine the amount of liquid in the intermediate vessels. The level sensors are used to determine the timing of liquid transfer operations including the filling and pressurizing of the intermediate vessels such that one vessel is being filled while the other is dispensing liquid, so that a constant controllable liquid output flow is achieved.

A major consideration in the design of liquid transfer systems, not previously mentioned, is the amount of space required for the liquid transfer apparatus. Typically, the components of a liquid transfer systems are enclosed within a cabinet along with semiconductor manufacturing apparatus. Therefore, it is desirable that each component of a system be as compact as possible.

The pressurizable vessels require a relatively large amount of space. The vessels are typically formed by tubular structures being closed on each end and formed a longitudinal axis. The length of each vessel is much greater than the diameter. In prior art liquid transfer systems, these vessels are typically disposed in an upright, or vertical, position wherein the length is disposed vertically. The main reason for disposing the vessels in an upright position is because the upright disposition allows the use of the capacitive type level sensors which provide sufficiently accurate measurements of liquid levels in the vessels while the vessels are disposed in an upright, or vertical, position.

It is desirable to be able to place the vessels in a horizontal position, wherein the length of the vessel is disposed vertically, in order to save space. However, capacitive-type level sensors are typically not as accurate in determining the amount of fluid stored in a vessel that is disposed in a horizontal position. This is due to the relatively smaller distance between the liquid level top surface and interior walls of the vessel opposite the liquid.

Further problems are incurred in determining the amount of fluid stored in a pressurizable vessel while the vessel is disposed in a horizontal position. Mechanical shock and vibration caused by the liquid transfer system and end use processing system create disturbances in the fluid stored in the vessels.

Accordingly, what is needed is an improved liquid transfer system using pressurizable vessels wherein the vessels are disposed in a horizontal position What is also needed is an improved liquid transfer system using pressurizable vessels wherein the vessels are isolated from mechanical shock and vibration caused by the processing system.

Further needed is an improved liquid transfer system using pressurizable vessels, the system providing a sensor coupled with the vessel, and operative to generate a signal indicative of the amount of fluid stored in the vessel while the vessel is disposed in a horizontal position.

SUMMARY OF THE INVENTION

One embodiment of the present invention provides a carriage assembly for holding a pressurizable vessel used in delivering fluid to a processing system, the pressurizable vessel having an elongated body defining a longitudinal axis, a first end, and a second end. The carriage assembly includes: a support structure for holding the vessel such that the axis is non-vertical, the support structure being substantially isolated from mechanical vibration caused by the processing system; and a sensor coupled with the vessel and operative to generate a signal indicative of the amount of fluid stored in the vessel.

In a particular embodiment, the support structure provides a fulcrum proximate the first end of the vessel, and the sensor includes a load sensor mechanically coupled with a portion of the vessel which is located proximate its second end. The sensor is operable to generate the signal in response to force exerted on the load sensor by the weight of the vessel. In a more particular embodiment, the load sensor is implemented using a strain gauge.

In a system according to the present invention, the vessel is in fluid communication with a liquid transfer system providing controlled communication of fluid between a liquid chemical supply tank and the processing system via the vessel. The manifold system is responsive to the signal indicative of the amount of fluid stored in the vessel, and operative to control the flow of fluid to and from the vessel based on the signal. In a particular embodiment, the manifold system and processing system are disposed in a cabinet, and the carriage assembly is disposed beneath the cabinet on a floor or other support mechanism, and the support structure provides substantial isolation of the vessel from mechanical shock and vibration caused by the processing system.

DETAILED DESCRIPTION

The present invention overcomes the problems associated with the prior art, by providing a carriage assembly having: a support structure for holding a pressure vessel in a non-vertical position and isolated from mechanical vibration; and a sensor coupled to the vessel and operative to generate a signal indicative of the amount of fluid stored in the vessel. Specifically, the present invention describes a pressure vessel carriage assembly for holding a pressure vessel used in delivering fluid to a processing system.

In the following description, numerous specific details are set forth (e.g., sensor types and particular support structure configurations) in order to provide a thorough understanding of the invention. Those skilled in the art will recognize, however, that the invention may be practiced apart from these specific details. In other instances, well known details of fluid handling systems (e.g., the use and operation of controlled valves) have been omitted, so as not to unnecessarily obscure the present invention.

Figure 1:
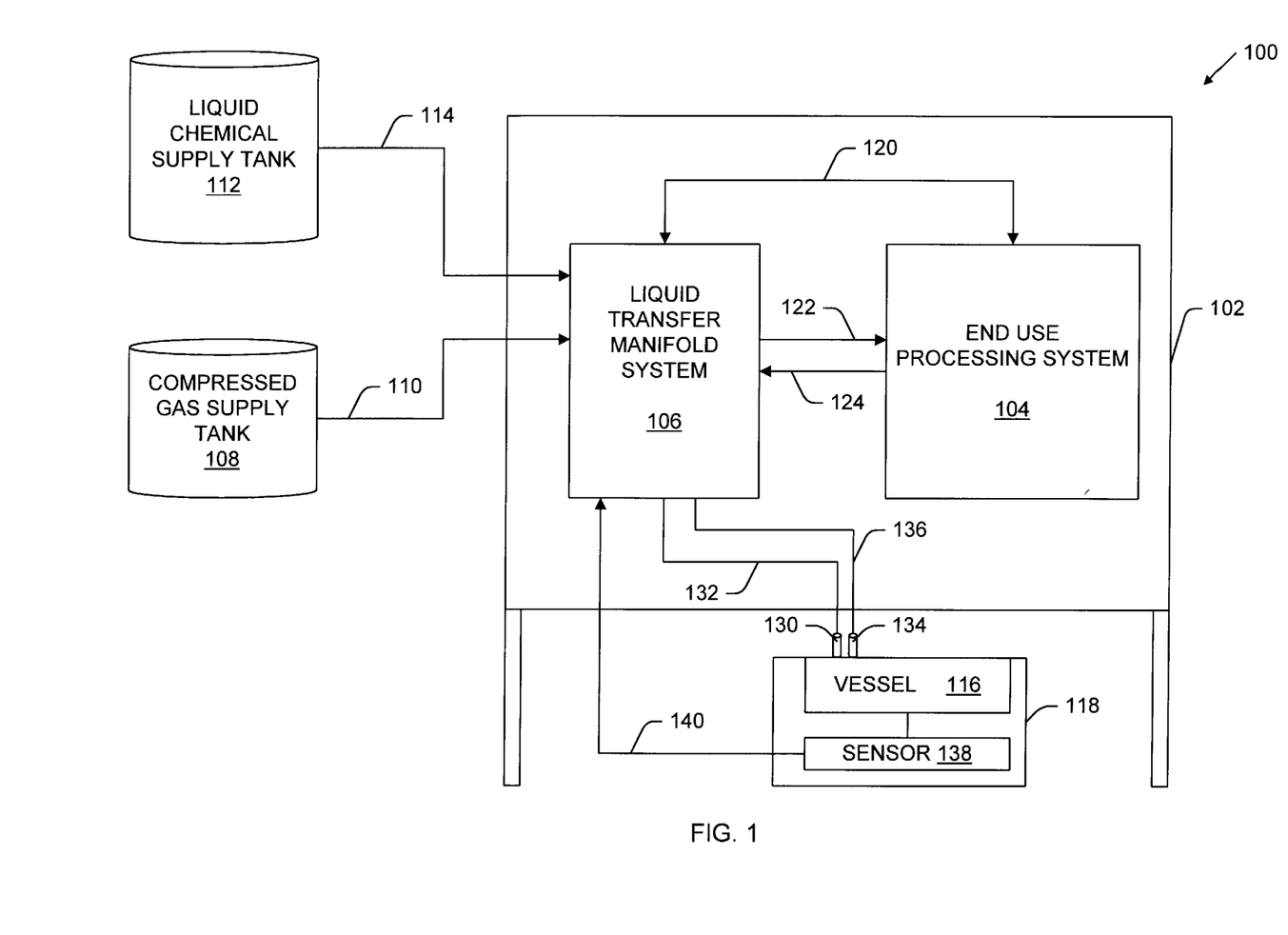
FIG. 1 is a block diagram showing a liquid delivery system used to transfer liquid chemical between a supply tank and a processing system via a pressure vessel supported by a carriage assembly in accordance with the present invention.

FIG. 1 is a block diagram showing a system 100 including: a cabinet 102 housing and supporting an end use processing system 104 and a liquid transfer manifold system 106; a compressed gas supply tank 108 coupled to provide compressed gas to the manifold system 106 via a gas supply conduit 110; a liquid chemical supply tank 112 coupled to provide liquid chemical to the manifold system 106 via a liquid supply conduit 114; and at least one pressure vessel 116 supported by a pressure vessel carriage assembly 118. In one application, system 100 is a semiconductor processing system, and processing system 104 is a wafer chamber.

Manifold system 106 provides for the transfer of liquid chemical from chemical supply tank 112 to processing system 104. A set of control lines 120 facilitates the transfer of control signals from processing system 104 to manifold system 106, and also facilitates the transfer of feedback information from manifold system 106 to processing system 104. Liquid chemical is transferred from manifold system 106 to processing system 104 via a liquid delivery conduit 122. Fluids are transferred from processing system 104 to manifold system 106 via a conduit 124. As further explained below, manifold system 106 is operative to open and close valves in response to the control signals received via control lines 120, the control signals indicating a current demand status for liquid chemical to be delivered to the processing system 104.

Pressure vessel 116 includes an elongated body defining a longitudinal axis and forming an interior chamber for temporary storage of fluids including liquid chemical and gas. Pressure vessel 116 includes a gas port 130 providing for the transfer of compressed gas between the manifold system 106 and the interior chamber of the vessel 116 via a gas conduit 132. Pressure vessel 116 also includes a liquid port 134 providing for the transfer of liquid chemical between the manifold system and the interior chamber of the vessel via a liquid chemical conduit 136.

In this particular embodiment of the present invention, carriage assembly 118 isolates pressure vessel 116 from mechanical shock and vibration caused by manifold system 106 and processing system 104 which are housed and supported by the cabinet. In order to save space, carriage assembly 118 and vessel 116 are disposed beneath cabinet 102, and carriage assembly 118 includes a support structure (not shown) for holding vessel 116 such that the longitudinal axis of vessel 116 is substantially horizontal, thereby minimizing vertical space required for carriage 118 and vessel 116 to allow for placement of vessel 116 under cabinet 102.

In one embodiment, carriage assembly 118 may be rested on the floor upon which cabinet 102 is supported. Those skilled in the art will recognize however that this is not an essential element of the present invention. For example, in an alternative embodiment, carriage 118 may be suspended in a damped fashion (e.g., by springs) from cabinet 102. In fact, in systems where vibrational isolation is not a concern, carriage 118 may be rigidly fixed to cabinet 102.

The carriage assembly further includes a sensor 138 coupled with vessel 116 and operative to generate a fluid level signal indicative of the amount of fluid stored in vessel 116 as further explained below. Manifold system 106 is coupled to receive the fluid level signal from sensor 138 via a control line 140. In accordance with the present invention, sensor 138 is designed to generate the fluid level signal for the specific case wherein the longitudinal axis of the vessel is substantially non-vertical. In one embodiment, sensor 138 is a load sensor that determines the amount of fluid stored in vessel 116, by determining the weight of the vessel, or the displacement of the vessel due to gravitational force. However, any other appropriate sensor may be used to determine the amount of fluid contained within vessel 116 while the vessel is disposed in a non-vertical position including but not limited to optical, acoustical, and piezoelectric sensors.

Based on the fluid level signal received from sensor 138 via signal line 140, and the control signals received from processing system 104 via control lines 120, manifold system 106 controls the flow of liquid chemical and compressed gas between manifold system 106 and vessel 116. The manifold system 106 generally includes conduits and valving (not shown) for implementing functions including: transferring liquid chemical from supply tank 112 to one or more vessels similar to vessel 116; and dispensing liquid from the vessels to processing system 104. In one embodiment, the manifold system 106 may also include pressure gauges and flow meters for monitoring transfer operations, and filtering units for filtering the liquid chemical.

In an embodiment, manifold system 106 is implemented by a port array block disclosed in U.S. patent application Ser. No. 09/177,856, entitled "Fluid Handling Port Array", filed on Oct. 23, 1998 by the present Applicant and incorporated herein by reference. In another embodiment, manifold system 106 is implemented by a liquid transfer system disclosed in Schell (U.S. Pat. No. 5,832,948, issued Nov. 10, 1998, and assigned to Chemand Corporation) and incorporated herein by reference. However, the particular type of manifold system used is not essential to the practice of the present invention.

Figure 2:
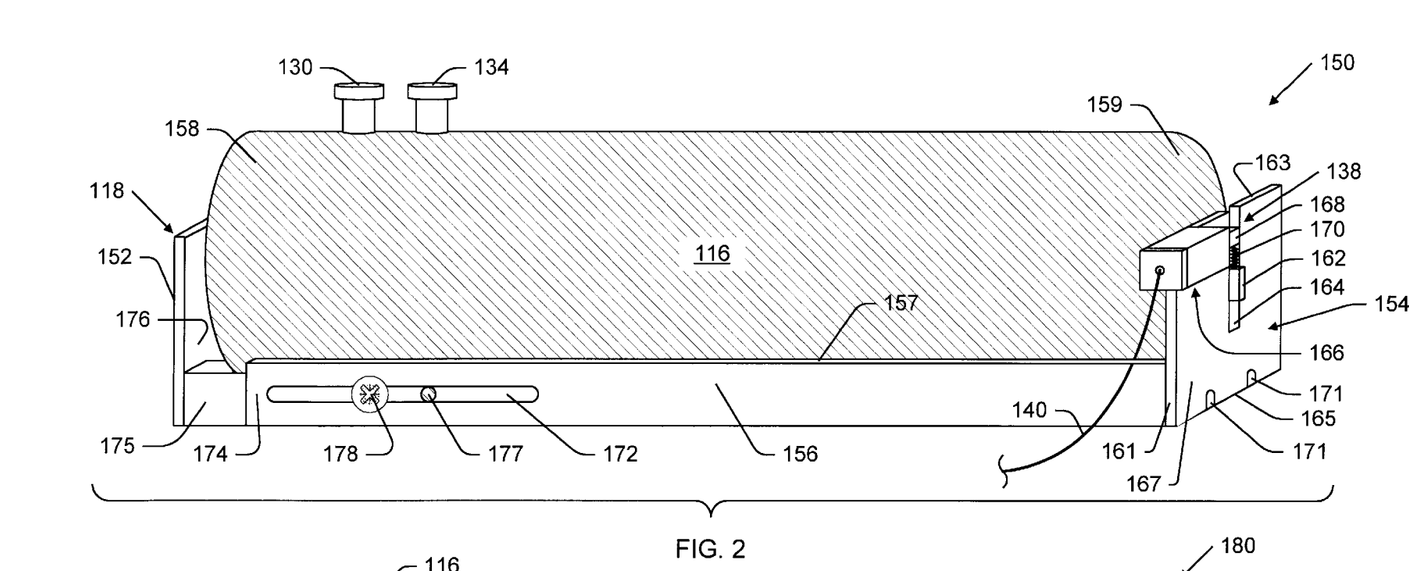
FIG. 2 is an isometric view showing details of one embodiment of the carriage assembly of FIG. 1 supporting a pressure vessel.

FIG. 2 shows an isometric view at 150 of a particular embodiment of carriage assembly 118 supporting pressure vessel 116. Carriage assembly 118 includes: a first end plate 152; a second end plate 154 disposed generally parallel to first end plate 152; and a pair of elongated longitudinal spreaders 156 joining bottom lateral end portions of first and second end plates 152 and 154, and extending in a generally normal direction between each of the end plates 152 and 154. In the depicted embodiment, end plates 152 and 154 are formed by substantially rectangular sheets having substantially equal heights and widths. Also, the end plates and elongated spreaders 156 are each formed of polypropylene. However, it is contemplated that other suitable materials may be used to form these components, and it is not essential to the practice of present invention that the end plates be rectangular or have equal heights and widths. Furthermore, it is contemplated that a myriad of alternative support structures could be used to hold vessel 116 in a non-vertical position.

Pressurizable vessel 116 is formed by an elongated cylindrical body defining a longitudinal axis and forming an interior chamber (not shown) for temporary storage of fluids including liquid chemical and gas. Vessel 116 includes: a first end 158 having a projection (not shown) adapted to engage with a hole (not shown) formed in first end plate 152 to provide a fulcrum for supporting the pressure vessel in a cantilever relationship with first end plate 152; and a second end 159 having a tang, or tab, 162 extending axially away from the interior chamber of the vessel.

The second end plate 154 has a slot 164 formed therethrough and extending vertically from a medial portion of a top edge 163 of second end plate 154 to a point proximate a bottom edge 165 of second end plate 154. Slot 164 has a width adapted for receiving tang 162 of vessel 116 so that the tang may travel vertically in the slot 164 as vessel 116 pivots about the fulcrum (not shown) formed between the first end 158 of vessel 116 and first end plate 152 in response to the force of gravity as further described below.

In the depicted embodiment, sensor 138 (FIG. 1) is implemented as a load sensor used to determine the amount of fluid in vessel 116 by determining the weight of the vessel. Sensor 138 includes: a sensor bracket 166 attached to the top portion of an end surface 167 of second end plate 154, on one side of slot 164; and a strain gauge 168 supported by sensor bracket 166 and coupled with tang 162 of vessel 116 via a tether line 170. In an embodiment, tether line 170 is implemented by a screw passing through strain gauge 168 and engaging a threaded hole formed in a top surface of tang 162. Strain gauge 168 is operative to generate an electrical signal proportional to a strain, or force, incident upon the strain gauge, the signal being provided via an electrical signal output (not shown) to signal line 140.

It is not essential to the practice of the present invention that sensor 138 be attached to second end plate 154. In other embodiments, sensor 138 may be disposed beneath the vessel 116, or at any other position on the carriage assembly 118 at which a coupling or support relationship may be established with vessel 116. For example, a load sensor may be suspended above a medial portion of vessel 116 and coupled to a tab (not shown) attached to a top medial portion of the vessel. In this example, the length of the vessel could be increased without extending the length of the carriage. Note also that the amount of force applied to the load sensor by a lever arm extending from the fulcrum to a medially disposed tab is less than the force applied by a lever arm extending the entire length of the vessel as in the depicted example.

In operation, as vessel 116 is filled with fluid under control of manifold 106 (FIG. 1) via ports 130 and 134, the force of gravity incident on the vessel is increased forcing tab 162 vertically downward and thereby increasing the force incident on strain gauge 168 via tether line 170. The strain gauge is responsive to this force and operative to generate the fluid level signal which is provided to manifold 106 (FIG. 1) via signal line 140, the fluid level signal being proportional to the weight of the contents of the vessel. In a particular embodiment, strain gauge 168 is implemented by a RL-1040 single point, aluminum strain gauge manufactured by Rice Lake Weighing Systems of Rice Lake Wis.

In order to accommodate a variety of different sizes of vessel 116, having different lengths and diameters, carriage assembly 118 is adjustable in length. For this purpose, spreaders 156 include slots 172 formed therethrough each extending along the length of the spreader from a point proximate a first end 174 of the spreader, proximate first end plate 152, to a point disposed at a distance therefrom. First end plate 152 has a pair of spreader extension members 175 extending in a generally normal direction away from bottom portions of an interior surface 176 of first end plate 152, extension members 175 extending generally parallel to the spreaders 156. A pair of dowels 177 extend transversely from extension members 175 into slots 172. Dowels 177 slide along the length of slots 172 and provide stability as first end plate 152 is extended away from and retracted toward second end plate 154. A pair of bolts 178 pass through slots 172 and into holes (not shown) formed in the extension members 175. Tightening bolts 178 secures extension members 175 to spreaders 156 in order to secure the position of first end plate 152 with respect to second end plate 154. Therefore, slots 172 and extension members 175 provide one means for adjusting the length of carriage assembly 118 thereby allowing the carriage assembly to hold vessels of varying lengths, but those skilled in the art will recognize that equivalent means for adjusting the length of carriage assembly 118 exist, including but not limited to spreaders which extend in a telescopic fashion, and spreaders having breaks at medial portions thereof between which extension members may be manually inserted.

In a particular embodiment, extension members 175 are welded to end plate 152. Alternatively, extension members 175 may be formed integrally with end plate 152, or attached by any other means. Also, in a particular embodiment, dowels 177 are press fit into bores (not shown) formed in extension members 175. Alternatively, dowels 177 may be formed integrally with extension members 175, or attached by any other means.

Second end plate 154 further includes a pair of weep holes 171 formed therethrough and intersecting the bottom edge 165 of the end plate, the weep holes providing an outlet from the carriage assembly 188 for any liquid which may spill from vessel 116, valves 130, 134 or any other source, including conduits or valves disposed above the carriage assembly. Likewise, first end plate 152 also includes a pair of weep holes (not shown) formed therethrough and intersecting the bottom edge of first end plate 152.

Figure 3:
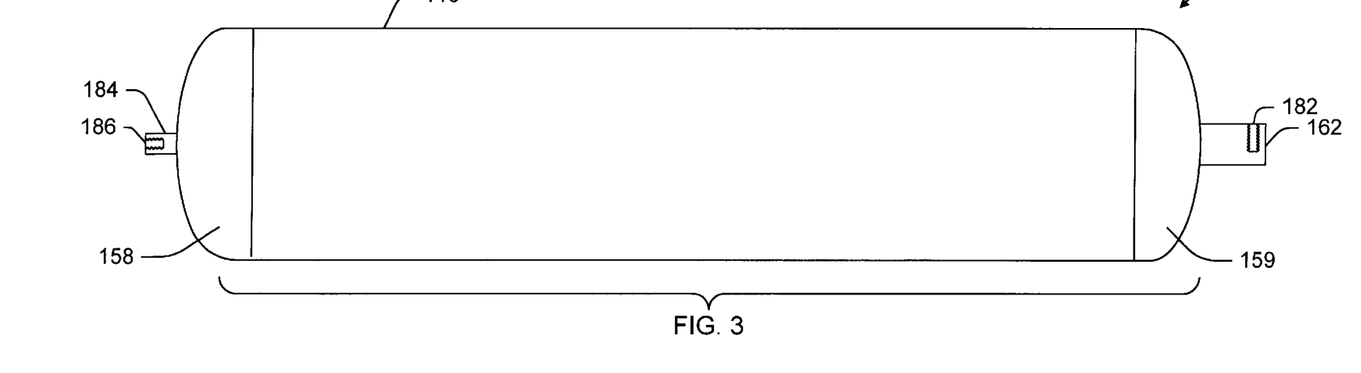
FIG. 3 is a side cross sectional view of the pressure vessel shown in FIG. 2.

FIG. 3 shows a cross sectional side view at 180 of vessel 116 which is adapted to be supported by carriage assembly 118 (FIG. 2). As shown, tang 162 includes a threaded hole 182 extending transversely to the longitudinal axis formed by the cylindrical body of vessel 116. Hole 182 is adapted to receive a screw for coupling with tether line 170 (FIG. 2). In the depicted embodiment, tang 162 is aligned with the central longitudinal axis of vessel 116. However, for different sized vessels 116, tang 162 may extend in parallel with the central longitudinal axis of vessel 116 from a point which is offset in the vertical direction from the center of second end 159 of the vessel so that tang 162 is disposed at an appropriate distance from the bottom of slot 164 (FIG. 2) when vessel 116 is installed within carriage assembly 118 (FIG. 2).

First end 158 of pressure vessel 116 includes a projection 184 extending axially away from the interior chamber of the vessel. Projection 184 is adapted to engage with a hole (not shown) formed in the first end plate 152 (FIG. 2) to provide a fulcrum for supporting the pressure vessel in a cantilever relationship with the first end plate. However, the fulcrum is not an essential element of the present invention. For example, in another embodiment, vessel 116 may be rested directly on a load sensor.

Figure 4:
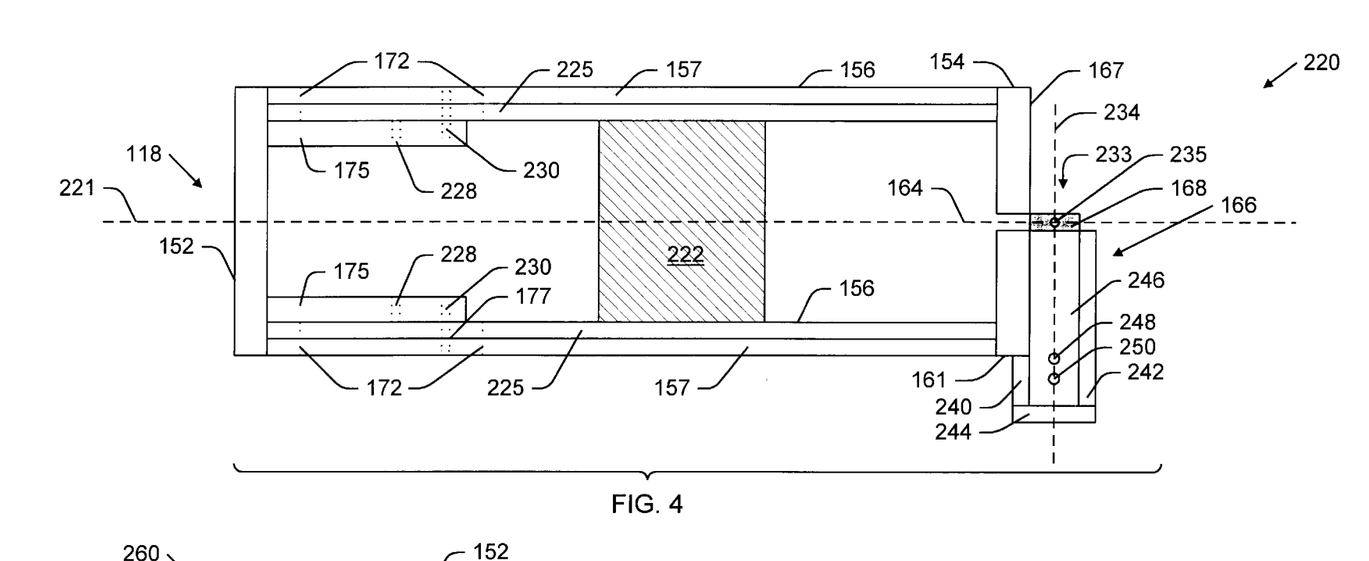
FIG. 4 is a top plan view of the carriage assembly of FIG. 2.

FIG. 4 shows a top plan view at 220 of carriage assembly 118 (FIG. 2). A central longitudinal axis 221 of the carriage assembly extends in a direction transverse to end plates 152 and 154 and is disposed midway between spreaders 156. As shown, spreaders 156 are joined by a lateral spreading plate 222 which is formed by a substantially rectangular shaped polyethylene sheet. The lateral spreading plate 222 provides structural support for the carriage assembly.

Each of the spreaders 156 includes a bevel 225 formed along an inner edge of the top surface 157 of the spreader. Extension members 175 slide along inner side surfaces of the spreaders 156, the inner side surfaces being adjacent bevels 225. Extension members 175 include threaded holes 228 formed therethrough for receiving bolts 178 (FIG. 2) passing through slots 172 formed in spreaders 156. Each of extension members 175 includes a bore 230 formed in its outer side wall and extending transverse to extension members 175. Bore 230 receives dowels 177 (FIG. 2) which pass through slots 172. In a particular embodiment, dowels 177 are press fit into bores (not shown) formed in extension members 175. Alternatively, dowels 177 may be formed integrally with extension members 175, or attached by any other means.

As mentioned, sensor bracket 166 is attached to the end surface 167 of second end plate 154 on one side of slot 164. Sensor bracket 166 includes a cavity (not shown) formed therein for supporting and protecting strain gauge 168. In the depicted embodiment, sensor bracket 166 forms a rectangular box defining a longitudinal sensor axis 234 extending in parallel with second end plate 154, the rectangular box being open at an end 233 proximate slot 164 so that strain gauge 168 may by inserted and withdrawn from the cavity (not shown) formed within bracket 166 via open end 233. Strain gauge 168 has a length which is slightly greater than the depth of the rectangular cavity (not shown) of bracket 166 so that a distal portion of strain gauge 168 extends out from the cavity as further explained below.

Sensor bracket 166 is adapted to support strain gauge 168 in a parallel relationship with second end plate 154 so that a threaded through hole 235 formed at the distal end of strain gauge 168 is disposed at an intersection of axis 221 of the carriage assembly and axis 234 of the sensor bracket, the intersection point lying at a very small distance from slot 164 along axis 221 of the carriage assembly. Through hole 235 is adapted to receive a threaded screw (not shown) of tether line 170 (FIG. 2) for the purpose of bearing the weight of the pressure vessel 116 (FIG. 2). In order to minimize the distance along axis 221 between slot 164 and through hole 235, a portion of end surface 167 of the end plate is used as a portion of a side wall of sensor bracket 166.

Sensor bracket 166 includes: a first partial side panel 240 formed by a rectangular sheet extending in parallel with second end plate 154 from side surface 161 (FIG. 2) of second end plate 154 in a direction away from slot 164; a second side panel 242 formed by a rectangular sheet extending in parallel with first side panel 240 from a point proximate slot 164 to a point equidistant from slot 164 with a distal edge of first side panel 240; an end panel 244 formed by a rectangular sheet joining end portions of side panels 240 and 242 which are opposite the ends of the side panels proximate slot 164; a bottom panel (not shown) formed by a rectangular sheet joining bottom portions of side panels 240, 242 and end panel 244; and a top panel 246 formed by a rectangular sheet joining top portions of the side panels 240, 242 and end panel 244.

Top panel 246 includes a pair of threaded through holes 248 and 250 disposed along sensor axis 234 at a distance from slot 164. Through holes 248 and 250 are adapted to align with threaded strain gauge holes (not shown) formed in strain gauge 168 at a distance along sensor axis 234 from through hole 235. Through holes 248 and 250 and the strain gauge holes are adapted to receive a pair of bolts for holding the strain gauge in the cavity (not shown) formed within bracket 166. Those skilled in the art will recognize that the particular details of the sensor bracket are not essential to the practice of the present invention. For example, in an alternative embodiment, sensor bracket may be implemented by a base panel for supporting strain gauge 168 without forming side panels and end panels to protect the strain gauge.

Figure 5:
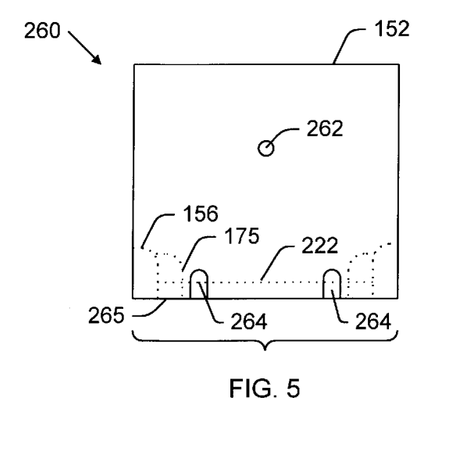
FIG. 5 is a side elevation view of a first end plate of the carriage assembly of FIG. 2.

FIG. 5 shows a side elevation view at 260 of first end plate 152 of carriage assembly 118 (FIG. 2), the first end plate 152 including a through hole 262 formed therethrough. The hole 262 is formed through the first end plate at a position approximately half of the width of the end plate from either side edge of the end plate, and at a sufficient distance above a bottom edge of the end plate to allow for the hole 262 and projection 184 (FIG. 3) to serve as the fulcrum for supporting vessel 116 (FIG. 2) in a cantilever relationship with the first end plate.

As mentioned, first end plate 152 includes a pair of weep holes 264 intersecting a bottom edge 265 of the first end plate. Weep holes 264 are disposed between extension members 175 so that any fluid accumulated on the surface supporting carriage assembly 118 (FIG. 4), within the bounds of the carriage assembly (defined by endplates 152, 154 and spreaders 156), may flow out via the weep holes.

Figure 6:
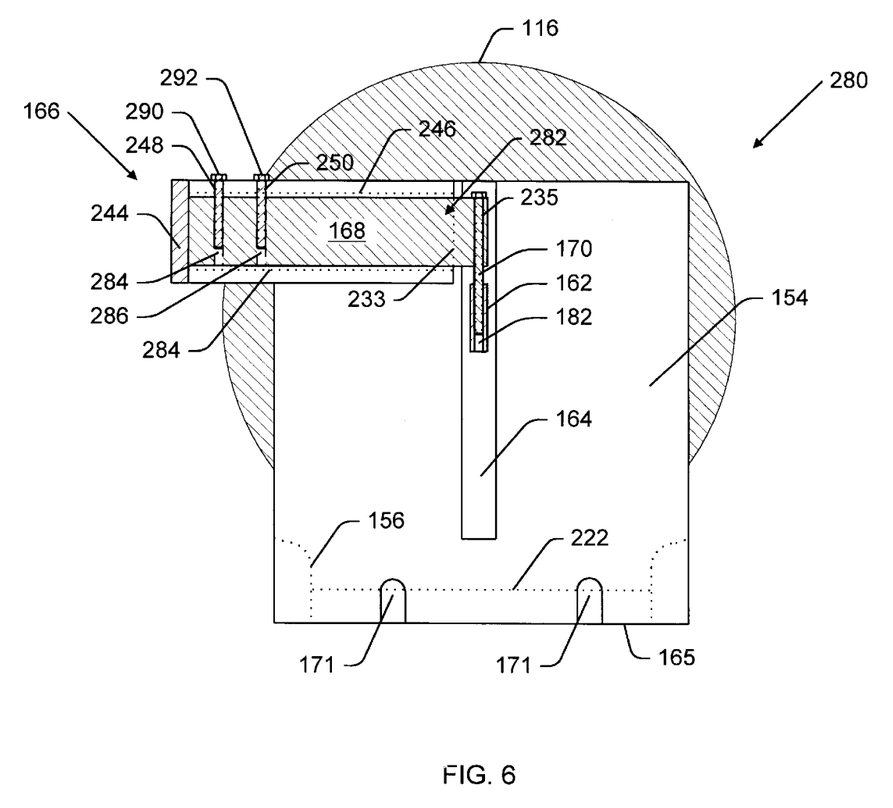
FIG. 6 is a cross sectional side view of the first end plate of the carriage assembly of FIG. 2 wherein a vessel is mounted to the carriage assembly.

FIG. 6 shows a cross sectional side view of second end plate 154 of the carriage assembly wherein vessel 116 is installed in the carriage assembly, and strain gauge 168 is installed in sensor bracket 166 and coupled to tang 162. As mentioned, sensor bracket 166, which is attached to second end plate 154 as described above, forms a rectangular box defining a cavity 282. A bottom panel 284 of sensor bracket 166 is formed by a rectangular sheet joining bottom portions of side panels 240, 242 and end panel 244. Strain gauge 168, which is inserted within cavity 282 and supported vertically by the bottom panel 284 of the sensor bracket, includes a pair of threaded holes 286, 288 formed therein and extending vertically from a top surface of the strain gauge to a point proximate the bottom surface. With the strain gauge inserted within the cavity, holes 286, 288 are aligned with threaded through holes 248 and 250 formed in top panel 246 of the sensor bracket. A pair of threaded bolts 290, 292 are adapted to pass through and engage threaded through holes 248 and 250 and engage threaded holes 286, 288 of the strain gauge for holding the strain gauge within the cavity.

In the depicted embodiment, tether line 170 is implemented as a threaded screw passing through and engaging threaded hole 235 formed through the distal end of strain gauge 168, and engaging threaded hole 182 formed in tab 162 which extends from vessel 116. Those skilled in the art will recognize that a threaded screw is not essential to implementing the tether line. For example, in an alternative embodiment, tether line 170 may be implemented by a wire with a looped end for receiving the tang.

While the invention has been shown and described with regard to certain preferred embodiments, it will be well understood by those skilled in the art that have read the preceding specification, that certain alterations and modifications to the system may be made without departing from the true spirit and scope of the invention. For example, the use of the present invention is not limited to manufacturing applications. Rather, the invention may be employed wherever it is desirable to provide a configurable fluid handling system in a compact space, including but not limited to scientific instrumentation. Therefore, the following claims are to be interpreted as covering all such alterations and modifications as would fall within the true spirit and scope of the invention.

What I claim is:

1. A carriage assembly for holding a fluid vessel of a liquid transfer system, the fluid vessel having a substantially cylindrical, elongated body defining a longitudinal axis, a first end, and a second end, said body and said first and second ends defining an internal chamber, said vessel further including a projection extending axially from said first end and away from said chamber, and a tab extending axially from said second end and away from said chamber, the carriage assembly comprising:

a support structure for holding the vessel such that the axis is non-vertical, said support structure being not rigidly fastened to said liquid transfer system and including a first end plate having a hole formed therein for receiving said projection to provide a fulcrum for supporting said vessel in a cantilever relationship with said first end plate, and a second end plate disposed substantially parallel to said first end plate and including a slot formed therein for receiving said tab, said slot being formed to allow said tab to travel in a substantially vertical direction within said slot as said vessel pivots about said fulcrum; and a load sensor affixed to said second end plate at a position above said tab and coupled to said tab via a tether line; and whereby the weight of said vessel exerts force on said load sensor, via said tab and said tether line, so that said load sensor generates a signal indicative of the amount of fluid stored in the vessel.

2. A carriage assembly as recited in claim 1 wherein said first and second end plates are each formed by rectangular sheets, and wherein said slot formed in said second end plate extends vertically to intersect a top edge of said second end plate.

3. A carriage assembly as recited in claim 1 wherein said load sensor comprises:

a sensor bracket attached to a top portion of said second end plate; and a strain gauge supported by said bracket and coupled with said tab via said tether line.

4. A liquid transfer system for delivering fluid from a supply tank to a processing system, the liquid transfer system comprising:

a vessel having an elongated body defining a longitudinal axis, a first end, and a second end, said body and said first and second ends defining an internal chamber, said vessel also having at least one port formed therethrough to provide communication with said chamber;

a carriage assembly including, a support structure for holding the vessel such that the axis is non-vertical, said support structure being not rigidly fastened to the liquid transfer system, and a sensor coupled with the vessel and operative to generate a signal indicative of the amount of fluid stored in the vessel;

a manifold system in fluid communication with at least one of said ports of said vessel, said manifold system providing controlled communication of fluid between the supply tank and the processing system via the vessel; and a cabinet supporting said manifold system and said processing system, and wherein said carnage assembly is disposed beneath said cabinet.

* * * * *